United States Patent Office 2,734,026
Patented Feb. 7, 1956

2,734,026

ELECTRODEPOSITION OF COPPER-ZINC ALLOYS

Allan E. Chester, Highland Park, Ill., assignor to Poor & Company, Chicago, Ill., a corporation of Delaware No Drawing. Application September 12, 1951, Serial No. 246,335

16 Claims. (Cl. 204—44)

This invention relates to new and useful electroplating compositions, and to a new and improved method for the electrodeposition of alloys of zinc and copper.

One of the objects of the invention is to prepare new and useful cyanide-zinc-copper plating baths.

Another object of the invention is to prepare new and useful cyanide-zinc-copper plating baths containing complex organic compounds which are soluble in alkaline solutions and which produce improved color and brightening effects.

An additional object of the invention is to provide a new and improved method for electrodepositing bright zinc-copper alloy plates. Other objects will appear hereinafter.

In accordance with the invention, new and useful cyanide-zinc-copper plating baths are provided containing reaction products obtained by the reaction of oxy-aldehydes, preferably cyclic oxy-aldehydes, and amines containing primary and/or secondary amino groups and a water solubilizing radical from the group consisting of hydroxy, carboxy and sulfonic and salts thereof. The reaction products useful for the purpose of the invention are characterized by the fact that they are soluble in alkaline aqueous solutions having a pH of about 12 and do not form the characteristic deep blue complex copper ions in cyanide solutions containing sodium cuprous cyanide ($Na_2Cu(CN)_3$).

An oxy-aldehyde useful as one of the starting materials for the preparation of the aforesaid reaction products may be illustrated by the general formula $$R-\overset{H}{\underset{}{C}}=O$$

in which R represents an organic radical, residue or nucleus, preferably having a cyclic or ring structure, and containing either in said ring structure or as part of a side chain the grouping $$-\overset{|}{\underset{|}{C}}-O-\overset{|}{\underset{|}{C}}-$$

The term "oxy-" is used in accordance with the definition given in Hackh, Chemical Dictionary (1944), page 607. Where the oxygen atom is a part of the cyclic structure of the cyclic aldehyde the ring structure is described as heterocyclic or, more specifically, as oxy-heterocyclic (see Hackh, Chemical Dictionary [1944], page 406). The oxy-aldehydes which are preferred for use as starting materials to produce reaction products employed in accordance with the invention are furfural, piperonal and p-methoxy benzaldehyde (anisic aldehyde).

An amino compound useful as the other starting material preferably has the general formula $X-R_1-NH_2$ in which X represents a water solubilizing group, as for example —OH, —$SO_3H$, or —COOH (that is, hydroxy, sulfonic or carboxylic), $R_1$ represents a hydrocarbon structure which may be either aliphatic, aromatic, alicyclic or cycloaliphatic, and —$NH_2$ represents a primary amino group. Examples of the preferred amino compounds employed to make the addition products for the purpose of the invention are 2-methyl 2-amino 1-propanol, mixed isopropanol amines, and anthranilic acid.

While the preferred compounds prepared for the practice of the invention are the reaction products of organic aldehydes containing one aldehydic group with organic amino compounds containing a single primary amino group, in equimolecular proportions, it will be understood that the reaction may also be effected between organic aldehydes of the type described and polyamino organic compounds of the type referred to, in which case the proportion of the aldehyde is preferably increased sufficiently to react with the additional amino groups present in the organic amino compound. Thus, if the organic amino compound contains two primary amino groups, two molecular proportions of the aldehydic compound are preferably employed.

It is also possible for reaction to take place between the aldehydic groups and secondary amino groups. Accordingly, the amino compound employed in carrying out the reaction can contain secondary amino groups instead of primary amino groups or can contain both primary and secondary amino groups. However, I have not been able to obtain the desired reaction products with tertiary amines, as for example, triethanol amine.

While the properties of the reaction products may differ somewhat, depending upon the starting materials, the preferred products of the invention have the general formula $$R-\overset{H}{\underset{}{C}}=N-R_1-X$$

in which R represents an oxy-hydrocarbon structure, preferably an oxy-heterocyclic nucleus or radical, $R_1$ represents a hydrocarbon group, as for example, methylene, ethylene, propylene, butylene, isopropylene, the radical $$H_3C-\overset{CH_3}{\underset{|}{C}}-CH_2-$$

the radical

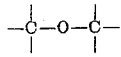

phenylene, naphthylene and cyclohexylene, and X represents a water solubilizing radical, preferably the hydroxy or carboxy radical. The preferred addition reaction products employed as addition agents for the purpose of the invention are soluble to substantially insoluble in water but dissolve in alkaline solutions and are at least sparingly soluble in ethyl alcohol. In metallic hydroxide solutions the hydrogen atom can exchange for a metal ion or salt-forming radical, such as —Na, —K, etc. Similarly, any other free acid radicals present would be neutralized.

Typical examples of the preferred reaction products for the purpose of the invention are the reaction products of furfural, piperonal or anisic aldehyde with any one of the amine compounds, such as 2-methyl 2-amino 1-propanol, anthranilic acid and mixed isopropanol amines containing primary, secondary and tertiary isopropanol amines. One example of a commercial isopropanol amine mixture contains the following compounds in the percentages listed:

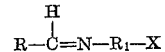 43%

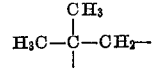 43%

$H_2N.CH_2.CHOH.CH_3$  14%

The invention will be illustrated but is not limited by the following examples in which the quantities are stated in parts by weight unless otherwise indicated.

*Example I*

One-tenth of a mole of furfural and 1/10 of a mole of anthranilic acid are added to 150 cc. of iso-propyl alcohol and the mixture is refluxed for about 45 minutes to an hour. When the product begins to precipitate heating is discontinued and the product is separated by filtration. This product in solid or powder form has an orchid color, is insoluble in water, dissolves in alkaline zinc-cyanide solutions to give a yellow solution, and is sparingly soluble in ethyl alcohol, iso-propyl alcohol, and butyl alcohol. The chemical structure is indicated by the formula:

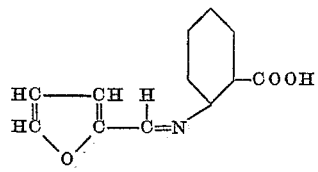

Excellent brightening effects are obtained when this product is incorporated into alkaline zinc-copper-cyanide electroplating baths, particularly in combination with reaction products of gelatin and aldonic acids or in combination with reaction products of protein-rich seed meals and aldonic acids, and in proportions from about 1.0 grams to 25 grams of the furfural anthranilic acid reaction product per gallon of electrolyte.

*Example II*

Approximately 1/10 mole of piperonyl aldehyde is mixed with 1/10 mole of anthranilic acid in 150 cc. of iso-propyl alcohol and refluxed for 2 to 3 hours. The reflux condenser is then removed and the iso-propyl alcohol distilled off until the volume is reduced to approximately one-half (say, about 70 cc.), and thereafter the reaction mixture is cooled. Beautiful yellow crystals of the reaction product of piperonyl aldehyde and anthranilic acid are formed and are filtered off. The residual and the recovered alcohol is used for further reactions. This product is also insoluble in water, dissolves in alkaline solutions to give a yellow solution, and is sparingly soluble in ethyl alcohol. The chemical structure is indicated by the formula:

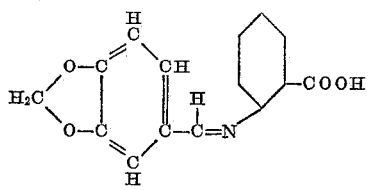

Excellent brightening effects are obtained when this product is incorporated into alkaline cyanide-zinc-copper plating baths, preferably in combination with reaction products of gelatin and aldonic acids or reaction products of protein seed meals and aldonic acids, and preferably in proportions within the range from about 1.0 to 25 grams per gallon of electrolyte. Larger amounts may be employed, but in general do not increase the color effect or brightness of the electrodeposited metal beyond the increase obtained with the maximum amounts in the range specified.

*Example III*

Anisic aldehyde and 2-methyl 2-amino 1-propanol are reacted together by mixing them in proportions of 10% by volume of the aldehyde and 90% by volume of the amine. The reaction takes place at room temperature but is facilitated by heating at moderately higher temperatures up to around 125° F. Although the reaction apparently occurs between equimolecular proportions of the aldehyde and the amine, an excess of the amine is preferably employed.

The anisic aldehyde is insoluble in water and substantially insoluble in alkaline cyanide zinc-copper plating baths. The 2-methyl 2-amino 1-propanol is soluble in water. The reaction product of the anisic aldehyde and the 2-methyl 2-amino 1-propanol is soluble in water and in alkaline cyanide zinc-copper plating baths.

Excellent brightening effects are obtained when this product is incorporated into alkaline cyanide zinc-copper plating baths, preferably in combination with reaction products of gelatin and aldonic acids or reaction products of protein seed meals and aldonic acids, and preferably in proportions within the range of 1 to 25 grams of said reaction product per gallon of electrolyte. The degree of brightness will vary depending upon the amount of brightener used.

*Example IV*

The procedure is the same as in Example III, except that furfural is substituted in equivalent proportions for anisic aldehyde.

*Example V*

The procedure is the same as in Example III, except that a mixture of iso-propanol amines containing 43% tertiary isopropanol amine, 43% secondary iso-propanol amine and 14% primary iso-propanol amine is substituted for the 2-methyl 2-amino 1 propanol.

*Example VI*

The procedure is the same as in Example III, except that piperonyl aldehyde is substituted in chemically equivalent proportions for the anisic aldehyde.

In the foregoing examples the percentage by weight of the aldehyde will usually be within the range of 0.2% to 50% by weight of the amine. Although the reaction apparently takes place between the aldehydic group and a primary or secondary amine group, it is possible that some reaction may also occur between the aldehydic group and a hydroxyl group where the amine contains such a group. Both reactions involve the elimination of water.

The employment of the water soluble aliphatic hydroxy amines in these reactions is especially advantageous. The oxyaldehydes employed are insoluble in water but sufficiently soluble in the aliphatic hydroxy amines to permit reaction to take place without employing a mutual solvent.

The amine-aldehyde addition agents herein described are preferably employed in alkaline cyanide zinc-copper electrolytes in conjunction with a carrier with or without the addition of an antipitting agent.

*Example VII*

A. A stock solution of the anisic aldehyde-2-methyl 2-amino 1-propanol is prepared by reacting together 10% by volume of the aldehyde and 90% by volume of the amine as described in Example III.

B. A carrier is prepared by mixing together 0.5 gram per gallon of gelatin, 12 grams per gallon of dithiobiuret and 2/10 gram per gallon of gum acacia or gum arabic in water. The mixture is allowed to soak in cold water and then heated until clear.

C. An electrolyte is prepared by dissolving zinc cyanide, sodium hydroxide and sodium copper cyanide $Na_2Cu(CN)_3$ in water to produce a bath containing .99 ounce per gallon of Cu, 4.50 ounces per gallon of Zn, 13 ounces per gallon of total NaCN and 7 ounces per gallon of NaOH. This bath has a pH of about 11.95. The electrolyte is treated with 1 to 8 cc. per gallon of sodium polysulphide solution at room temperature (75° F.) and allowed to stand until sulphide precipitation occurs. This removes traces of heavy metal such as lead. The bath is filtered with an ordinary type of siliceous or diatomaceous earth filter aid and is now ready for the addition of the ingredients described under A and B.

Approximately 1 to 25 cc. of A is added to each gallon of C. Approximately ½ to 5 grams of B is added to each gallon of C.

A zinc-copper alloy is plated from this electrolyte onto polished steel in plain steel or polyvinyl acetate lined tanks, preferably at temperatures of 75° to 85° F. with mechanical cathode agitation, a voltage of 1 to 3 volts direct current at the tank, a cathode current density of 10 to 100 amperes per square foot, a cathode current efficiency of 60 to 90%, an anode current density of 20 amperes per square foot and an anode current efficiency of 80 to 100%.

The anodes used are preferably alloys of zinc and copper containing 88 to 81.5% zinc and 12 to 18.5% copper. Instead of using an alloy anode a zinc anode may be used and the copper can be replaced in the bath as it is used up by adding additional $Na_2Cu(CN)_3$. Alternatively, both zinc and copper can be added to the bath and inert anodes, such as steel or graphite anodes, can be employed.

The copper may be added to the bath as copper cyanide, sodium copper cyanide, or copper carbonate. The zinc may be added to the bath as zinc cyanide, sodium zinc cyanide, or zinc carbonate. Strong anions such as sulphate or chloride ions are preferably avoided.

Bright zinc-copper alloys are deposited from the foregoing bath and the resultant plated articles are suitable for the direct plating of chromium thereover without buffing and without the necessity for using an intermediate nickel plate.

*Example VIII*

The procedure is the same as described in Example VII except that 1/10% to 1% by volume of a solution of chromium gluconate is added to the electrolyte. The chromium gluconate is a product obtained by mixing together an aqueous solution of a chromium compound selected from the group of hexa-valent and tri-valent chromium compounds which are soluble in the presence of water and alkalis, and an aqueous solution of gluconic acid under conditions effective to cause an exothermic reaction to take place between said chromium compound and said gluconic acid, in the presence of an alkali metal compound, the ratio of chromium atom to alkali metal atom being within the range of 1:1 to 1:3, the ratio of chromium atom to gluconic acid molecule between the range of 1:1 to 1:3, and the ratio of total alkali metal atom plus the gluconic acid molecule to the chromium atom being at least 3:1, said product forming clear green stable solutions in water. The preparation of these chromium aldonates is described in U. S. Patent 2,428,356. The employment of the chromium aldonates as addition agents in alkaline cyanide zinc-copper electrolytes is especially desirable when plating out of such electrolytes at low current densities.

*Example IX*

The procedure is the same as that described in Example VII except that 0.01 to 0.1% by weight of an oxyethylated soy bean amine (Ethomeen S-20) having an average molecular weight of 714 is added to the electrolyte. The oxy-ethylated soy bean amine acts as an antipitting agent and is especially useful in plating at low current densities in that it prevents the formation of hydrogen bubbles on the surface of the work being plated. In a similar manner other surface tension reducing agents which are stable in the alkaline cyanide zinc-copper plating baths can be employed. The tertiary oxy-alkylated long chain alkyl amines containing 14 to 60 carbon atoms in their alkyl groups and oxyalkylated with at least 7 moles of an alkylene oxide per mole of amine are preferred for the practice of the invention.

*Example X*

The procedure is the same as in Example VII except that the carrier B is made by mixing 0.5 grams per gallon of gelatin, 0.5 to 10 grams per gallon of glucono delta lactone, 1 to 12 grams per gallon of dithiobiuret, and 2/10 grams per gallon of acacia gum or gum arabic in water.

*Example XI*

The procedure is the same as described in Example VII except that the carrier B consists of 1 gram per gallon of a composition made by mixing together 50 parts by weight of gelatin, 25 parts by weight of soya bean protein and 25 parts by weight of commercial dextrose.

*Example XII*

The procedure is the same as described in Example VII except that the carrier B is made by mixing together 50 parts by weight of sodium arsenate or sodium arsenite, 25 parts by weight of edible gelatin, and 25 parts by weight of soya bean protein.

*Example XIII*

The procedure is the same as in Examples VII to XII except that the reaction product described in Example I is substituted for the reaction product described in Example III.

*Example XIV*

The procedure is the same as in Example VII except that the reaction product described in Example II is substituted for the product described in Example III.

*Example XV*

The procedure is the same as in Example VII except that the reaction product described in Example IV is substituted for the product described in Example III.

*Example XVI*

The procedure is the same as in Example VII except that the product described in Example V is substituted for the product described in Example III.

*Example XVII*

The procedure is the same as in Example VII except that the product described in Example VI is substituted for the product described in Example III.

In a similar manner other reaction products of oxyaldehydes and primary or secondary amines containing a water solubilizing group are suitable for the practice of the invention. As previously indicated, typical specific examples of suitable aldehydes for the preparation of these reaction products are anisic aldehyde, furfural and piperonyl aldehyde. Typical examples of amino compounds suitable for reaction with any of the foregoing aldehydes are hydroxyaliphatic water soluble monoamines and polyamines (e. g. hydroxyethyl ethylenediamine) and ortho, meta and para amino benzene carboxylic acids, the alpha amino beta carboxy naphthalenes, the alpha carboxy beta naphthylamines and the various polyamino carboxylic acids of the benzene or naphthalene series. The amine aldehyde condensation products employed for the purpose of this invention are generally characterized by solubility in alkaline aqueous solutions.

Where a carrier is used it is preferable to employ a protein type carrier such as, for example, the protein-aldonic acid reaction products described in U. S. Patent 2,458,504. Such protein carriers are reaction products of gelatin or vegetable protein-rich seed meals with aldonic acids, e. g., gluconic, mannonic, galactonic and arabonic or the lactones of these acids. These carriers act as bright range extending agents. The protein aldonic acid compositions when further reacted with oxy-aldehydes also serve to enhance the brightness of the plated zinc-copper alloy.

When other aldehydes were substituted for furfural in Example III, e. g., formaldehyde, benzaldehyde, acetaldehyde or cinnamic aldehyde, the reaction between the amine and the aldehyde took place but the resultant products did not have the desired brightening effect in plating alloys of zinc and copper from alkaline cyanide baths. Likewise, furfural reacted with furfurylamine but the resultant furfural-furfurylamine reaction product did not produce the desired brightening effect in plating alloys of zinc and copper from alkaline cyanide baths.

Since the desired results in plating chromium can be obtained by plating the chromium over an alloy plate of zinc and copper consisting of 12 to 18.5% copper and the remainder zinc, there is no particular advantage to the employment of a zinc-copper alloy containing a higher percentage of copper but it will be understood that the invention is applicable to plating brass generally and particularly to the plating of predominantly zinc alloys of zinc and copper which have silvery appearance.

The presence of cupric copper in the plating bath is generally undesirable because it gives rough plates and may be reduced or eliminated by incorporating reducing sugars, such as dextrose, with the carrier.

The practice of the invention leads to improved color and brightness in the electrodeposition of zinc-copper alloys from alkaline cyanide zinc-copper plating baths. Alloy coatings produced out of these baths are lustrous and bright and have a color which will permit the application fo thin chromium films without discoloring these films and makes it possible to eliminate the use of nickel plating. Plated zinc-copper films are very bright without buffing and are just as corrosion resistant as nickel. Since nickel plating is very expensive the process of the invention has obvious advantages from the standpoint of reducing costs. The amine aldehyde addition products employed as brightening agents in accordance with the invention do not discolor the bath by forming deep blue copper complexes.

The invention is hereby claimed as follows:

1. A plating bath comprising an alkaline zinc copper cyanide bath containing in solution a quantity of the product of the reaction of a cyclic oxy-aldehyde and a water soluble aliphatic amine containing amino groups from the group consisting of primary and secondary amino groups, said amine further containing a water solubilizing radical from the group consisting of hydroxy, carboxy and sulfonic radicals and salts thereof, said reaction product being soluble in alkaline aqueous solutions having a pH of about 12 and characterized by the fact that said product does not form deep blue complex copper ions in cyanide solutions containing sodium cuprous cyanide, said quantity being sufficient to enhance the brightness of the zinc-copper plate electrodeposited from said bath.

2. A plating bath comprising an alkaline zinc copper cyanide bath containing in solution a quantity of the product of the reaction of a cyclic oxy-aldehyde and a water soluble primary aliphatic hydroxy amine, said reaction product being soluble in alkaline aqueous solutions having a pH of about 12 and characterized by the fact that said product does not form deep blue complex copper ions in cyanide solutions containing sodium cuprous cyanide, said quantity being sufficient to enhance the brightness of the zinc-copper plate electrodeposited from said bath.

3. A plating bath comprising an alkaline zinc copper cyanide bath containing in solution a quantity of the product of the reaction of anisic aldehyde and an aliphatic amine containing amino groups from the group consisting of primary and secondary amino groups, said amine further containing a water solubilizing radical from the group consisting of hydroxy, carboxy and sulfonic radicals and salts thereof, said reaction product being soluble in alkaline aqueous solutions having a pH of about 12 and characterized by the fact that said product does not form deep blue complex copper ions in cyanide solutions containing sodium cuprous cyanide, said quantity being sufficient to enhance the brightness of the zinc-copper plate electrodeposited from said bath.

4. A plating bath comprising an alkaline zinc copper cyanide bath containing in solution a quantity of the product of the reaction of furfural and an aliphatic amine containing amino groups from the group consisting of primary and secondary amino groups, said amine further containing a water solubilizing radical from the group consisting of hydroxy, carboxy and sulfonic radicals and salts thereof, said reaction product being soluble in alkaline aqueous solutions having a pH of about 12 and characterized by the fact that said product does not form deep blue complex copper ions in cyanide solutions containing sodium cuprous cyanide, said quantity being sufficient to enhance the brightness of the zinc-copper plate electrodeposited from said bath.

5. A plating bath comprising an alkaline zinc copper cyanide bath containing in solution a quantity of the product of the reaction of piperonal and an aliphatic amine containing amino groups from the group consisting of primary and secondary amino groups, said amine further containing a water solubilizing radical from the group consisting of hydroxy, carboxy and sulfonic radicals and salts thereof, said reaction product being soluble in alkaline aqueous solutions having a pH of about 12 and characterized by the fact that said product does not form deep blue complex copper ions in cyanide solutions containing sodium cuprous cyanide, said quantity being sufficient to enhance the brightness of the zinc-copper plate electrodeposited from said bath.

6. A plating bath comprising an alkaline zinc copper cyanide bath containing in solution a quantity of the product of the reaction of anisic aldehyde and 2-methyl 2-amino 1-propanol, said reaction product being present in a sufficient quantity to enhance the brightness of the zinc-copper plate electrodeposited from said bath.

7. A plating bath comprising an alkaline zinc copper cyanide bath containing in solution a quantity of the product of the reaction of anisic aldehyde and mixed primary, secondary and tertiary isopropanol amines, said reaction product being present in said bath in a sufficient quantity to enhance the brightness of the zinc-copper plate electrodeposited from said bath.

8. A plating bath comprising an alkaline zinc copper cyanide bath containing in solution a quantity of the product of the reaction of furfural and 2-methyl 2-amino 1-propanol, said reaction product being present in a sufficient quantity to enhance the brightness of the zinc-copper plate electrodeposited from said bath.

9. A plating bath comprising an alkaline zinc copper cyanide bath containing in solution a quantity of the product of the reaction of furfural and mixed primary, secondary and tertiary isopropanol amines, said reaction product being present in said bath in a sufficient quantity to enhance the brightness of the zinc-copper plate electrodeposited from said bath.

10. In the electrodeposition of alloys of zinc and copper, the step which comprises electrodepositing said alloys from an alkaline zinc copper cyanide plating bath having dissolved therein a quantity of the alkali soluble reaction product of a cyclic oxy-aldehyde and an aliphatic amine containing amino groups from the group consisting of primary and secondary amino groups, said amine further containing a water solubilizing radical from the group consisting of hydroxy, carboxy and sulfonic radicals and salts thereof, said quantity being sufficient to enhance the brightness of the zinc-copper plate electrodeposited from said bath.

11. In the electrodeposition of alloys of zinc and copper, the step which comprises electrodepositing said alloys from an alkaline zinc copper cyanide plating bath having dissolved therein a quantity of the alkali soluble reaction product of an oxy-aldehyde from the group consisting of anisic aldehyde, furfural and piperonal and an aliphatic amine containing amino groups from the group consisting of primary and secondary amino groups, said amine further containing a water solubilizing radical from the group consisting of hydroxy, carboxy and sulfonic radicals and salts thereof, said quantity being sufficient to enhance the brightness of the zinc-copper plate electrodeposited from said bath.

12. In the electrodeposition of zinc copper alloys which are predominantly zinc and have a silvery appearance the step which comprises electrodepositing such alloys from an alkaline zinc copper cyanide plating bath containing in solution an alkali soluble reaction product of a cyclic oxy-aldehyde and a water soluble primary aliphatic hydroxy amine in a sufficient quantity to enhance the brightness of the electrodeposited zinc-copper alloy.

13. In the electrodeposition of zinc-copper alloys the step which comprises electrodepositing a zinc-copper alloy from an alkaline zinc copper cyanide bath containing in solution a reaction product of anisic aldehyde and 2-methyl 2-amino 1-propanol in a sufficient quantity to enhance the brightness of the electrodeposited alloy, the ratio of zinc and copper being sufficient to produce an alloy containing 88 to 81.5% zinc and 12 to 18.5% copper.

14. In the electrodeposition of zinc-copper alloys the step which comprises electrodepositing a zinc-copper alloy from an alkaline zinc copper cyanide bath containing in solution a reaction product of furfural and 2-methyl 2-amino 1-propanol in a sufficient quantity to enhance the brightness of the electrodeposited alloy, the ratio of zinc and copper being sufficient to produce an alloy containing 88 to 81.5% zinc and 12 to 18.5% copper.

15. In the electrodeposition of zinc-copper alloys the step which comprises electrodepositing a zinc-copper alloy from an alkaline zinc copper cyanide bath containing in solution a reaction product of piperonal and 2-methyl 2-amino 1-propanol in sufficient quantity to enhance the brightness of the electrodeposited alloy, the ratio of zinc and copper being sufficient to produce an alloy containing 88 to 81.5% zinc and 12 to 18.5% copper.

16. In the electrodeposition of zinc-copper alloys, the step which comprises electrodepositing such alloys from an alkaline zinc copper cyanide bath containing in solution the reaction product of anisic aldehyde and mixed primary, secondary and tertiary isopropanol amines, said reaction product being present in said bath in a sufficient quantity to enhance the brightness of the zinc-copper plate electrodeposited from said bath.

References Cited in the file of this patent

UNITED STATES PATENTS

| | | |
|---|---|---|
| 2,436,316 | Lum et al. | Feb. 17, 1948 |
| 2,451,426 | Bair et al. | Oct. 12, 1948 |
| 2,495,629 | Chester et al. | Jan. 24, 1950 |
| 2,680,712 | Diggin et al. | June 8, 1954 |